United States Patent [19]

Mochizuki et al.

[11] Patent Number: 5,006,704
[45] Date of Patent: Apr. 9, 1991

[54] OPTICAL SCANNER AND METHOD FOR GENERATING AND DETECTING A COMPOSITE DOT ON A SCANNING MEDIUM

[75] Inventors: Takeshi Mochizuki; Shigenobu Katagiri; Minoru Seino; Minoru Ohshima; Susumu Saito; Akira Arimoto, all of Ibaraki, Japan

[73] Assignees: Hitachi Koki Co., Ltd.; Hitachi Ltd., Tokyo, both of Japan

[21] Appl. No.: 418,363

[22] Filed: Oct. 5, 1989

[30] Foreign Application Priority Data

Oct. 19, 1988 [JP] Japan ................................. 63-261502

[51] Int. Cl.5 .............................. G01J 1/32; H01J 3/14
[52] U.S. Cl. ..................................... 250/235; 250/236; 250/205; 358/481; 358/457; 346/108
[58] Field of Search ................... 250/236, 235, 201.1, 250/234, 205, 561; 346/108; 358/199, 206, 481, 457; 350/6.5, 6.7, 6.8

[56] References Cited

U.S. PATENT DOCUMENTS

| | | | |
|---|---|---|---|
| 4,617,578 | 10/1986 | Nezu et al. | 350/6.8 |
| 4,760,407 | 7/1988 | Arimoto et al. | 346/108 |
| 4,768,043 | 8/1988 | Saito et al. | 346/108 |
| 4,809,021 | 2/1989 | Check et al. | 346/108 |
| 4,841,137 | 6/1989 | Mochizuki et al. | 250/236 |
| 4,887,225 | 12/1989 | Yao | 346/108 |
| 4,912,568 | 3/1990 | Shimano | 358/457 |

Primary Examiner—David C. Nelms
Assistant Examiner—Michael Messinger
Attorney, Agent, or Firm—Michael L. Keller

[57] ABSTRACT

An optical scanner and method in which light beams from a plurality of sources are directed onto a medium to form a composite spot. The relative positions of the beams are detected and changed to change the diameter of the composite spot so that lines formed by such spots appear unbroken. The modulating times, intensities and number of sources of the beams can also be varied to provide a linear relation between the dither matrix and the picture element density.

6 Claims, 4 Drawing Sheets

OPTICAL SCANNER AND METHOD FOR GENERATING AND DETECTING A COMPOSITE DOT ON A SCANNING MEDIUM

BACKGROUND OF THE INVENTION

1. Field of the Invention

The present invention relates to an optical scanner having a plurality of light sources forming a composite spot and capable of changing the diameter of the composite spot.

As shown in FIG. 1, when a line inclined by 45° is printed in a laser printer, spot diameter D must be larger than pitch d of a scanning line or the inclined line will appear broken. When the intensity distribution of the spot is of an isotropic Gauss type with a central intensity $I_o$ and the spot diameter is defined as a point having intensity $I_o/\exp(-2)$, the light intensity Ia at point a is provided by the following formula (1).

$$I_a = 2\, I_o \cdot \exp\{-2(\sqrt{2}\, d/D)^2\}$$

When a region having an intensity not less than $I_o/\exp(-2)$ is developed, the condition for preventing interruption of a line inclined by 45° is provided by the following inequality (2).

$$I_a \geq I_o/\exp(-2)$$

From the formula (1) and the inequality (2), the following inequality (3) is formed.

$$D/d \geq 1.22$$

The dither method is one method for representing the gradation of an image. In the dither method picture elements are decomposed to a matrix and the density of the picture elements changed by changing the coating ratio of this dither matrix. When a dither pattern is printed under the condition of the inequality (3), as shown in FIG. 2, the spot diameter is larger than the area of one dither matrix constituting picture element 71. Therefore, as shown in FIG. 3, the relation between the dither matrix coating ratio and the density of the picture element is not a linear relation. Thus the gradation representation becomes inaccurate in the region in which the dither matrix coating ratio is high. In FIG. 3, the density of the picture element is 1 at its maximum.

SUMMARY OF THE INVENTION

To overcome the conventional problems mentioned above, an object of the present invention is to provide an optical scanner for providing a preferable gradation as represented by the dither method.

To attain the above object, in the present invention, a light spot on a scanning medium is constructed by a plurality of light beams. The diameter of a composite spot is changed by changing the relative positions of the light beams on the scanning medium which form the composite spot. The diameter of the composite spot is further changed by changing the ratio of the number of oscillated beams. The spot diameter is effectively changed by changing the intensity of the beams. The spot diameter is further effectively changed by changing the modulating time of the above beams to change the moving distance of the beams on the scanning medium. The size of the spot diameter is changed as above to provide a linear relation between the dither matrix coating ratio and the picture element density at the time of printing.

BRIEF DESCRIPTION OF THE DRAWINGS

The present invention will be more apparent from the following description of the preferred embodiments thereof in conjunction with the accompanying drawings in which.

DESCRIPTION OF THE PREFERRED EMBODIMENT

The preferred embodiments of an optical scanner of the present invention will now be described in detail with reference to the accompanying drawings.

Figure 4:
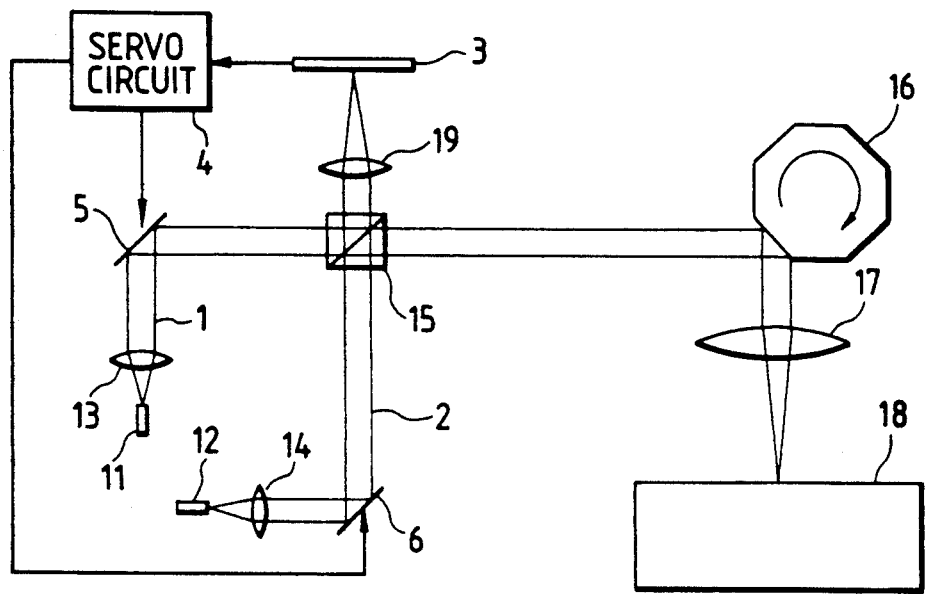
FIG. 4 is a schematic view showing an optical scanner in an embodiment of the present invention.

FIG. 4 shows an optical scanner in accordance with one embodiment of the present invention. Light beams 1, 2 emitted from two light sources 11, 12 are collimated by coupling lenses 13, 14 and are reflected by movable type reflectors 5, 6. The reflected light beams are incident into beam splitter 15 and separated onto the sides of rotary polygon mirror 16 and photodetector 3. The light beam separated on the side of rotary polygon mirror 16 is focused onto photosensitive drum face 18 by F theta lens 17, etc., and a scanning line is formed by the rotation of rotary polygon mirror 16. The light beam separated on the side of photodetector 3 is also focused onto photodetector 3 by throttle lens 19. Photosensitive drum face 18 and photodetector 3 are arranged on the focusing face of the lens system so that the photosensitive drum face 18 and the photodetector 3 and the light sources 11, 12 are arranged in an optically conjugate relation with respect to each other. When the relative positions of the two light spots produced on the photosensitive drum faces by light beams 1, 2 are changed, the positions of the two spots are detected by photodetector 3 and movable type reflectors 5, 6 are moved by a servo circuit 4 to change the positions of these reflectors, and hence the light spots.

Figure 5:
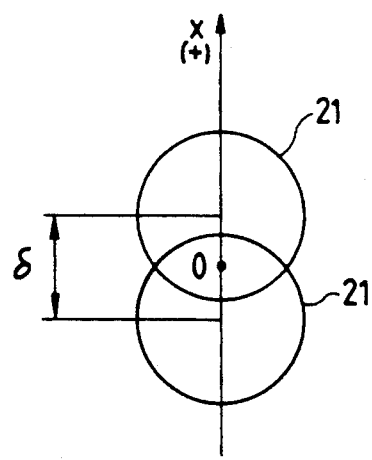
FIG. 5 is a schematic view showing the positions of two light spots on the scanning face.

FIG. 5 shows the relative positions of the two spots 21 having diameter D on the photosensitive drum face. The light intensity of the respective spots is assumed to have an isotropic Gauss distribution. When the central distance δ of the photosensitive drum in the rotary direction thereof (which is called the secondary direction in the following description) is changed, the intensity distribution I is provided by the following formula (4) and is shown by the solid line in FIG. 6.

$$I = I_o/2[\exp\{-2(x - \delta/2/D)^2\} + \exp\{-2(x + \delta/2/D)^2\}]$$

Figure 6:
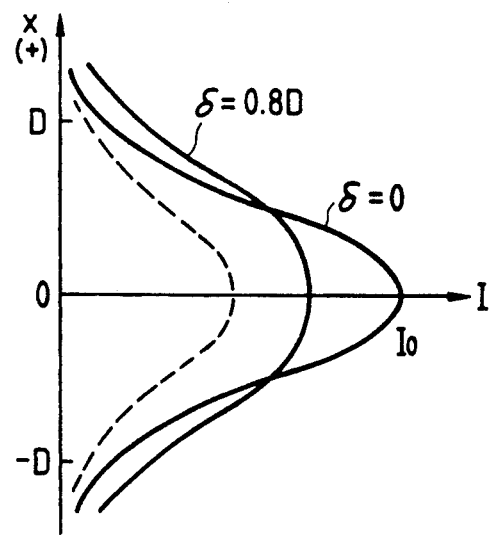
FIG. 6 is a graph showing the relation between the distance between the two spots on the scanning face and the light intensity distribution thereof.

Further, when only one of the two light sources 11, 12 is oscillated the intensity distribution I is provided by the following formula (5) and is shown by the broken line in FIG. 6.

$$I = I_o/2 \exp\{-2(x-\delta/2/D)^2\}$$

When the outputs of both light sources 11 and 12 are half that in the case of the formula (4), the intensity distribution I is provided by the following formula (6) and is shown by the broken line in FIG. 6 if $\delta=0$, similar to the case of the formula (5).

$$I = I_o/4[\exp\{-2(x - \delta/2/D)^2\} + \exp\{-2(x + \delta/2/D)^2\}]$$

Figure 7:
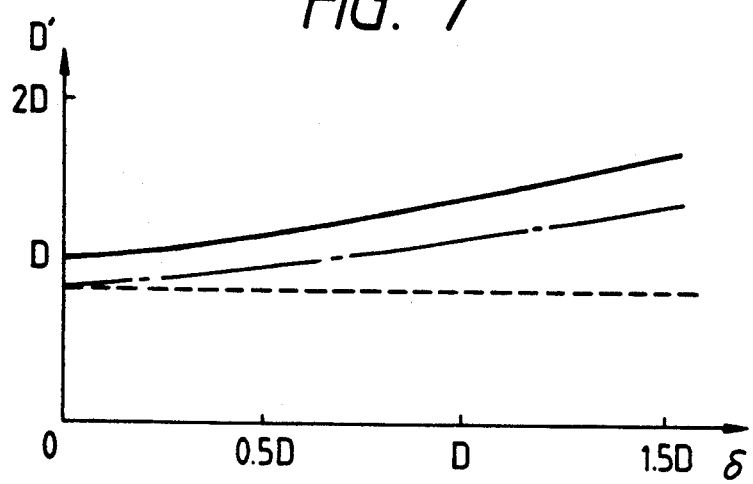
FIG. 7 is a graph showing the relation between the distance between the two spots on the scanning face and the diameter of a composite spot thereof.

FIG. 7 shows the relation between the above central distance $\delta$ and diameter $D'$ of a composite spot of the two spots when the spot diameter is defined at a point providing the intensity $I_o/\exp(-2)$. In this figure, the solid line, the broken line and one dotted chain line respectively show the spot diameters corresponding to the formulas (4), (5) and (6). The spot diameter by the broken line is constant irrespective of the central distance $\delta$.

Figure 8:
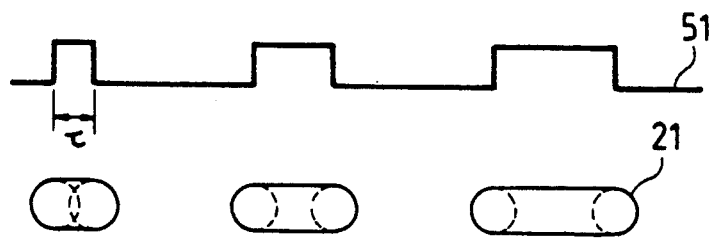
FIG. 8 is a schematic view showing the modulating time of a light beam and the movement of the spot on the scanning face.

As shown in FIG. 8, with respect to the scanning direction of the light beam by the rotary polygon mirror, the moving distance of the spot on the photosensitive drum face is changed by changing the modulating time I of the light beam so that the spot diameter can be effectively changed.

Figure 1:
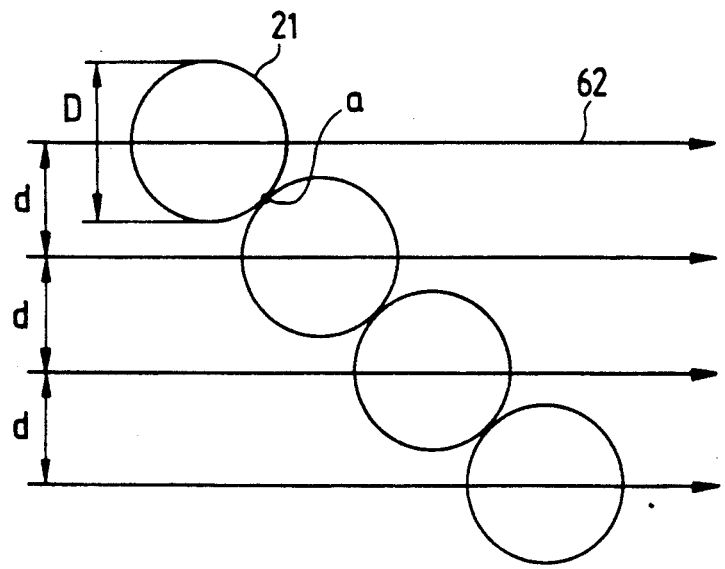
FIG. 1 is a schematic view showing the positions of a spot on a scanning face when a line inclined by 45° is printed.
Figure 2:
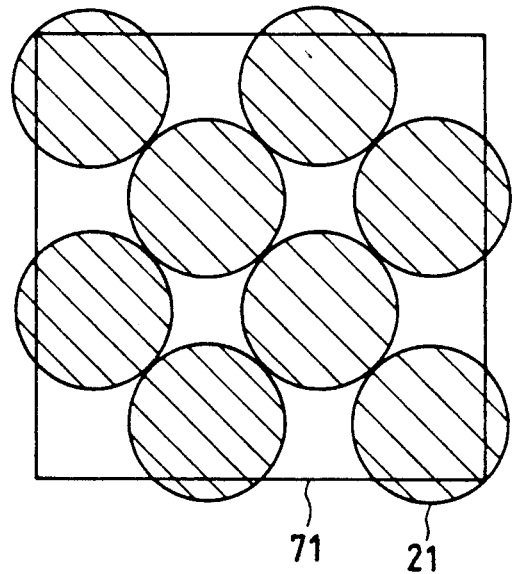
FIGS. 2 and 3 are schematic views showing the relation between a picture element and the spot when a dither pattern is printed.
Figure 3:
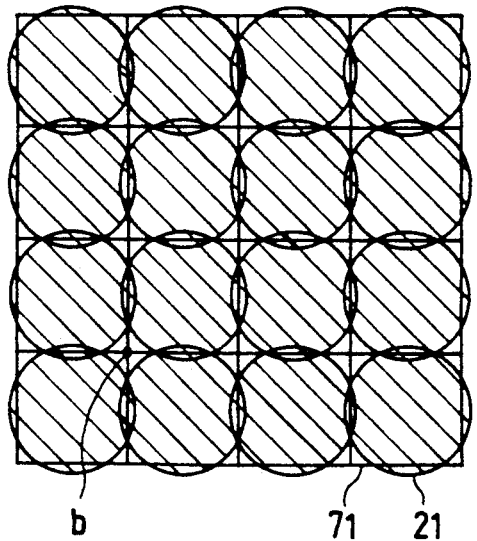
Figure 9:
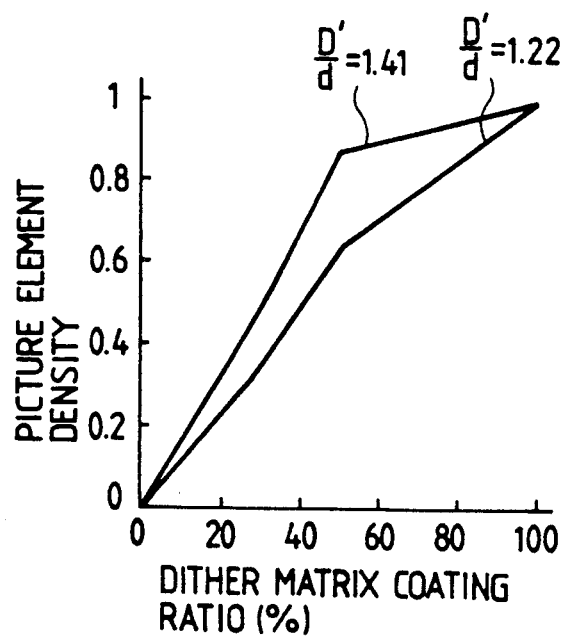
FIGS. 9, 10 and 11 are graphs showing the relation between the dither matrix coating ratio and the picture element density.

As shown in FIG. 9, a condition for providing the linear relation between the dither matrix coating ratio and the picture element density cannot be found by the relation of the inequality (3). FIG. 3 shows the position relation of the spot when the dither matrix coating ratio is 100% at the printing time of the dither pattern. The light intensity Ib at point b is provided by the following formula (7).

$$I_b = 4 I_o \exp[-2 (\sqrt{2} \, d/D')^2]$$

When a region having a light intensity not less than the intensity $I_o/\exp(-2)$ is developed, the condition in which the point b is developed and the picture element density is maximum is provided by the following inequality (8).

$$I_b \geq I_o/\exp(-2)$$

From the formula (7) and the inequality (8), the following inequality (9) is formed.

$$D'/d \geq 1.09$$

Figure 10:
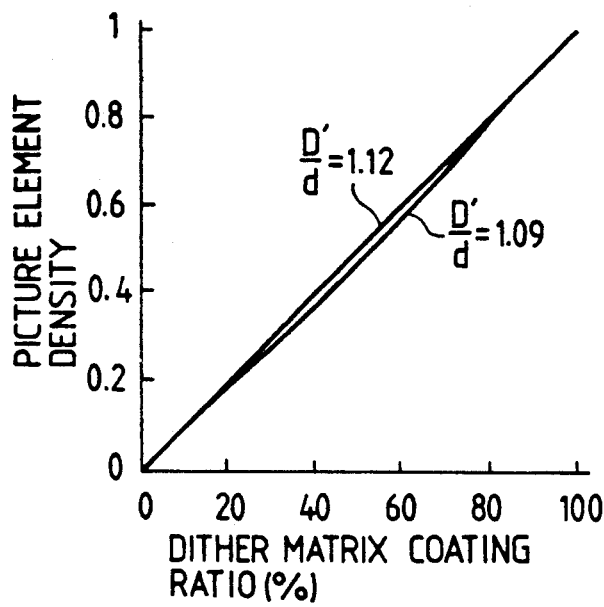

FIG. 10 shows the relation between the dither matrix coating ratio and the picture element density. This relation is approximately a linear relation when $D'/d = 1.12$ and provides a preferable gradation representation. Accordingly, the line inclined by 45° is not interrupted and the print having a preferable gradation can be provided when $D'/d \geq 1.22$ at the printing time of a line drawing image and $D'/d = 1.12$ at the printing time of the dither pattern. The spot diameter can be changed by changing the distance $\delta$ between the centers of the two spots on the scanning face and the modulating time t of the light beams as mentioned before.

By using this system, the gradation representation can be arbitrarily changed in accordance with what is necessary at the printing time of the dither pattern. For example, when the dither matrix coating ratio is R, $D'/d$ is changed in accordance with the following formula (10).

$$D'/d = 1 + 0.12R^4$$

Figure 11:
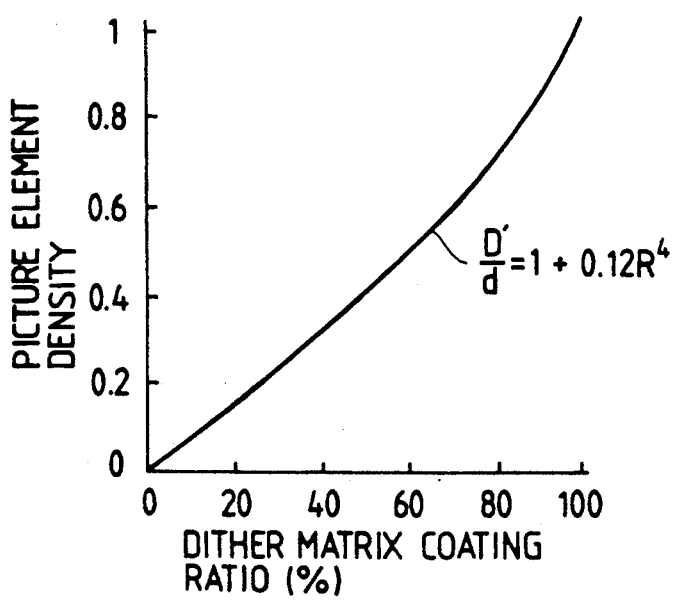

The picture element density is changed as shown in FIG. 11 and is gradually changed in a region of a small dither matrix coating ratio and is steeply changed in a region of a large dither matrix coating ratio.

Further, this system can be similarly applied to a method for representing other gradations such as a reticular point method, etc. This system can be similarly applied to the case in which it is preferable to change the spot diameter by switching the printing density, etc., in the line drawing image as well as an image providing the gradation representation.

As mentioned above, in accordance with the present invention, a plurality of light beams are employed so the spot diameter on a scanning medium can be effectively changed by changing the relative position of the light beams on the scanning medium, by changing the number of oscillated light beams, and by changing the modulating time of the light beams. Accordingly, the relation between the dither matrix coating ratio and the picture element density becomes linear at the printing time of the dither pattern, thereby providing a preferable gradation representation.

What is claimed is:

1. An optical scanner for scanning a medium comprising:
    a plurality of light sources for each generating a light beam;
    means for deflecting said light beams and converging said beams onto said medium to form a composite circular spot;
    means for detecting the relative positions of said beams forming said composite circular spot on said medium and producing an output indicating said relative positions; and
    means for changing the diameter of said composite circular spot by changing the relative positions of said beams in response to said output from said detecting means.

2. A scanner as in claim 1 further including means for modulating the light beams and means for changing the modulating times of the light beams.

3. A method of scanning a medium comprising the steps of:
    generating a plurality of light beams;
    deflecting said light beams and converging said beams onto said medium to form a composite circular spot;
    detecting the relative positions of said beams forming said spot on said medium and producing an output indicating said relative positions; and
    changing the diameter of said composite circular spot by changing the relative positions of said beams in response to said output.

4. A method as in claim 3 including the further step of changing the modulating times of the light beams.

5. A method as in claim 3 including the further step of changing the intensity of the beams.

6. A method as in claim 3 including the further step of changing the number of light sources generating said light beams which form said composite circular spot.

* * * * *